United States Patent [19]

Beam et al.

[11] Patent Number: 4,504,184
[45] Date of Patent: Mar. 12, 1985

[54] COMBINED HOIST-DUMP ASSEMBLY FOR TRUCKS

[76] Inventors: Roger B. Beam; Donald H. Beam, both of 2887 Gaines Rd., Albion, N.Y. 14411

[21] Appl. No.: 435,488

[22] Filed: Oct. 20, 1982

[51] Int. Cl.³ ............................................... B60P 1/64
[52] U.S. Cl. .................................. 414/498; 298/19 R; 298/38
[58] Field of Search ...................... 414/495, 498, 471; 298/19 R, 38

[56] References Cited

U.S. PATENT DOCUMENTS

2,527,369 10/1950 Meyer ............................ 414/498 X
3,362,552 1/1968 Thiele ............................. 414/495 X

Primary Examiner—Leslie J. Paperner
Assistant Examiner—Stuart J. Millman
Attorney, Agent, or Firm—Shlesinger, Fitzsimmons & Shlesinger

[57] ABSTRACT

A truck bed is releasably attached to a pair of spaced operating arms, which are mounted on the truck frame either to be moved up and down on the frame with arcuate, translational movement about a pair of spaced, parallel shafts that extend transversely of the frame, or to be pivoted at one end about one of the shafts in order to dump a load from the bed. A manually operable selector mechanism is provided, and in one position releasably secures one end of the operating members for pivotal movement about one of the shafts, while at the same time releasably securing the second shaft to the operating members for pivotal movement therewith. In its other position the selector mechanism releases the second shaft from the operating members and secures it against any movement while releasing said one ends of the operating members for translational movement, so that upon operation of an associated drive mechanism the two members are swung with arcuate, translational movement about the shafts. Whenever the bed is raised with translational movement it is automatically detached from the operating members so that it can be held by collapsible legs, or the like, in an elevated position above the truck frame. Conversely, when the bed is lowered by the members it is automatically reattached to the members. Several embodiments of the bed detaching and reattaching means are illustrated.

22 Claims, 8 Drawing Figures

COMBINED HOIST-DUMP ASSEMBLY FOR TRUCKS

BACKGROUND OF THE INVENTION

This invention relates to load hauling vehicles or trucks, and more particularly to a truck hoist and dump assembly, which enables the truck load bed selectively to be dumped by inclining it to the vertical, or to be exchanged by elevating and disengaging it from the truck chassis, so that the elevated bed can be supported on the ground by collapsible legs, jacks, or the like, and so that the truck chassis can be driven out from beneath the elevated bed.

Most conventional dump trucks utilize a load bed which is pivotally mounted on the rear end of a truck chassis for movement into and out of a plane inclined to the horizontal, thereby to enable a load to slide by gravity from the rear end of the bed. Each such load bed is usually mounted to pivot about a fixed, horizontal axis adjacent the rear end of the vehicle chassis, and is releasably locked at its forward end to the truck chassis to prevent any accidental pivoting of the bed out of its horizontal position.

In addition to the common dump truck, it has also been conventional to employ a so-called dumpster-type truck that carries a load bed that is releasably attached to the frame of the truck. A hydraulic lifting mechanism on the truck is operable to lift its load bed off the truck frame and onto the ground. By reversing the process the detached truck bed can once again be reattached to the frame of the truck for movement therewith. One of the disadvantages of these dumpster-type trucks is that it is usually necessary to employ a rather complicated hoisting device for positioning the releasable truck bed on, and for removing it from, the frame of the truck.

SUMMARY OF THE INVENTION

An object of this invention is to provide an improved load-hauling vehicle having a novel hoist and dump assembly for selectively tilting the truck's load bed about a stationary axis, as in the case of the conventional dump truck, or for elevating the bed above the truck frame while simultaneously releasing it or disengaging from the frame so that it can remain in an elevated position in which it is supported on collapsible legs so that the truck can be driven out from beneath the bed.

In each embodiment the bed is detachably supported on a combination hoist and dump assembly comprising a plurality of interconnected levers and links to which motion is imparted by a pair of conventional hydraulic cylinders of the type normally found on a common dump truck. A manually operable selector lever is mounted in the cab section of the vehicle for movement between two positions, in one of which it causes the bed to be tilted about its rear end into a dumping position, when the cylinders are operated, and in the other of which it causes the bed to be swung with translational, arcuate movement above and rearwardly of the truck frame. During this translational movement the bed becomes detached from the truck frame, and its lower or load bearing surface remains in the same, horizontal position it assumes prior to elevation, therefore preventing any disturbance of its load. Foldable or pivotal legs on the load bed can be swung down into operative positions for supporting the bed in its elevated, above-ground position.

Hook-shaped locking brackets project downwardly from each of the four corners of the load bed for engagement with opposite ends of a pair of locking rods which project beyond opposite sides of the bed adjacent its forward and rear ends respectively. The forward operating rod is mounted by a plurality of links for swinging movement beneath the bed, and into and out of locking engagement with the two slotted, or hook-shaped locking brackets that project downwardly from opposite sides of the bed at its forward end. Several different embodiments for manipulating the forward locking rod are disclosed.

THE DRAWINGS

Other objects and advantages of the invention will be apparent hereinafter from the specification and from the recital of the appended claims, particularly when considered in conjunction with the accompanying drawings, wherein

DETAILED DESCRIPTION OF THE PREFERRED EMBODIMENTS

Referring now to the drawings by numerals of reference, 10 denotes generally a truck having a cab section 11 supported on a pair of spaced, longitudinally extending frame members 12 and 13, which are similar in configuration. Secured at opposite ends by a pair of pins 15 to the underside of each frame member 12 and 13 adjacent the rear or left end thereof (FIG. 1) is a conventional suspension member or leaf spring 16. Rotatably journaled at opposite ends in the suspension members 16 is the rear drive axle or shaft 17 of the truck 10. Mounted on opposite ends of the axle 17 in the usual manner are two conventional truck tires or wheels which are illustrated diagramatically at W in the drawings.

Obviously the front of the truck (not illustrated) will also be supported on wheels in any conventional manner.

Figures 1, 1A:
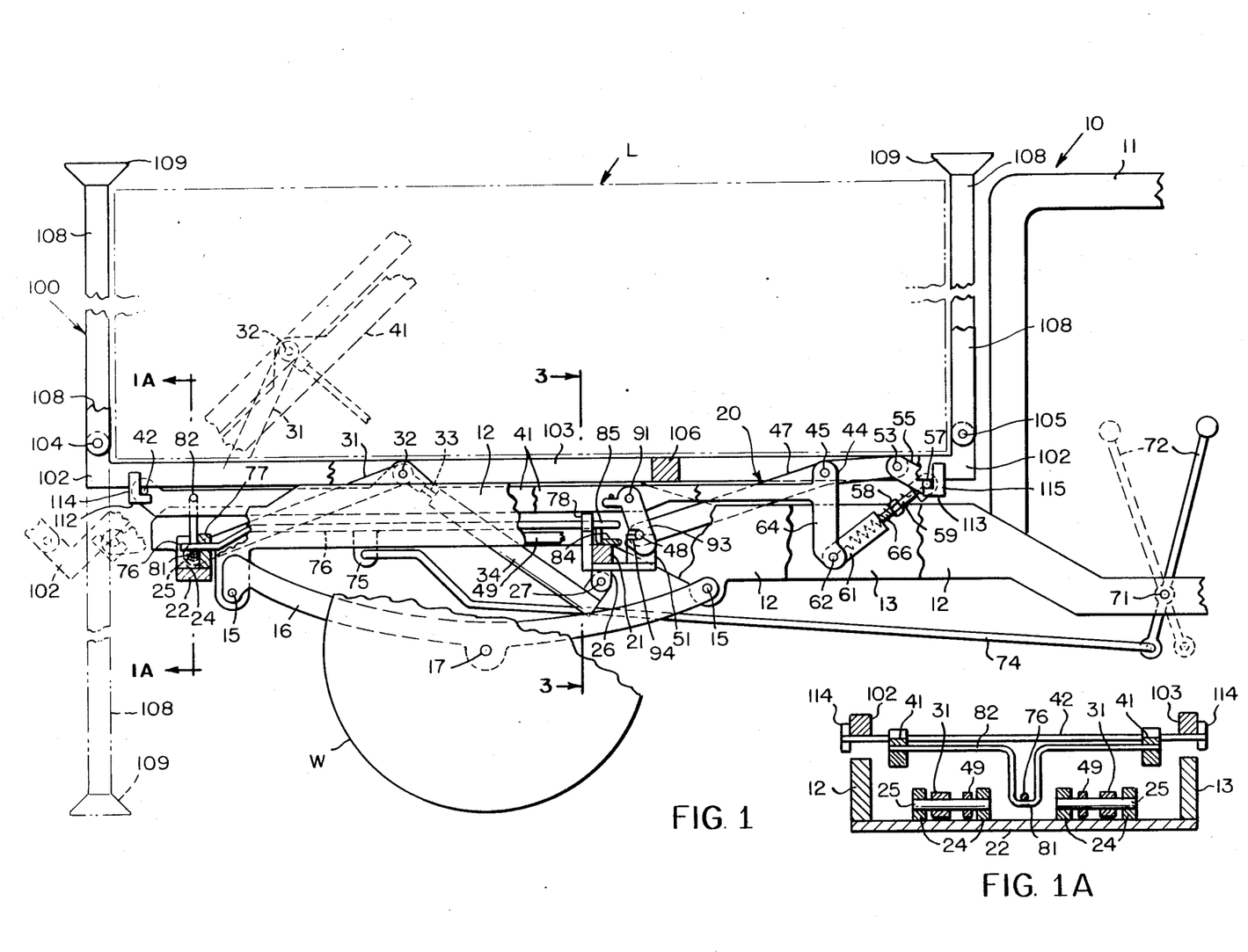
FIG. 1 is a fragmentary side elevational view of a truck or vehicle incorporating a novel hoist and dump assembly made according to one embodiment of this invention, portions of the vehicle being cut away for purposes of illustration.
FIG. 1A is a fragmentary sectional view taken along the line 1A—1A in FIG. 1 looking in the direction of the arrows.

Mounted on frame members 12 and 13 rearwardly of the cab section 11 is a combination hoist and dump assembly 20. This assembly comprises a pair of spaced, parallel, rigid beams or frame members 21 and 22, which are secured to the undersides of frame members 12 and 13 to extend transversely therebetween. As shown in FIG. 1, beam 21 is positioned just slightly forwardly of the rear wheels W, and beam 22 extends beneath the rear ends of frame members 12 and 13.

Secured at opposite ends in two pairs of spaced pillow blocks 24 that are secured in the upper surface of beam 22 inwardly of frame members 12 and 13 are two, fixed, coaxially disposed pivot pins 25, which extend parallel to the truck axle 17. Secured in a pair of spaced recesses 26 in the rear face of beam 21 are two other, fixed, coaxially disposed pivot pins 27 which extend parallel to the pins 25. In the embodiment illustrated the two pins of each set 25 and 27 are equi-spaced upon opposite sides of a vertical plane through the longitudinal centerline of truck 10.

Each of two, rigid, identically-shaped links 31 is pivotally connected at one end to one of the fixed pivot pins 25 and at its opposite end to an elongate rod or shaft 32 at spaced points intermediate its ends. Each of a pair of elongate cylinder rods 33 is also pivotally connected at one end (its upper end in FIG. 1) to shaft 32, and extends at its opposite end slidably into one end of one of a pair of conventional hydraulic cylinders 34. Each cylinder 34 is pivotally connected at its opposite or lower end to one of the other fixed pivot pins 27 on beam 21. As described in greater detail hereinafter, the hydraulic cylinders 34 are operable in unison to shift their associated rods 33 axially between retracted positions in which they hold shaft 32 in lowered positions between the frame members 12 and 13, and advanced or elevated positions in which they cause the shaft 32, and hence the attached levers 31, to be swung in arcuate paths (FIG. 1) into elevated positions (broken lines in FIG. 1) in which the shaft 32 is located above and rearwardly of its lowered position. During these movements the cylinder housings 34 are free to pivot, as may be necessary, about the fixed pivot pins 27.

Pivotally connected intermediate their ends to opposite ends of the shaft 32 outwardly of the pivotal connections of links 31 and rods 33 are two, elongate, identically-shaped load operating levers 41. At one of their ends (the left ends as shown in FIG. 1) the levers 41 project slightly beyond the rear ends of frame members 12 and 13 and are interconnected by a transversely extending bed locking rod 42, opposite ends of which project slightly beyond the outside surfaces of levers 41 for purposes noted hereinafter. The levers 41 which are spaced inwardly of frame members 12 and 13, extend forwardly over the frame beam 21 and have lugs 44 on their forward ends that are pivotally connected to opposite ends of a transverse shaft 45.

Figure 2:
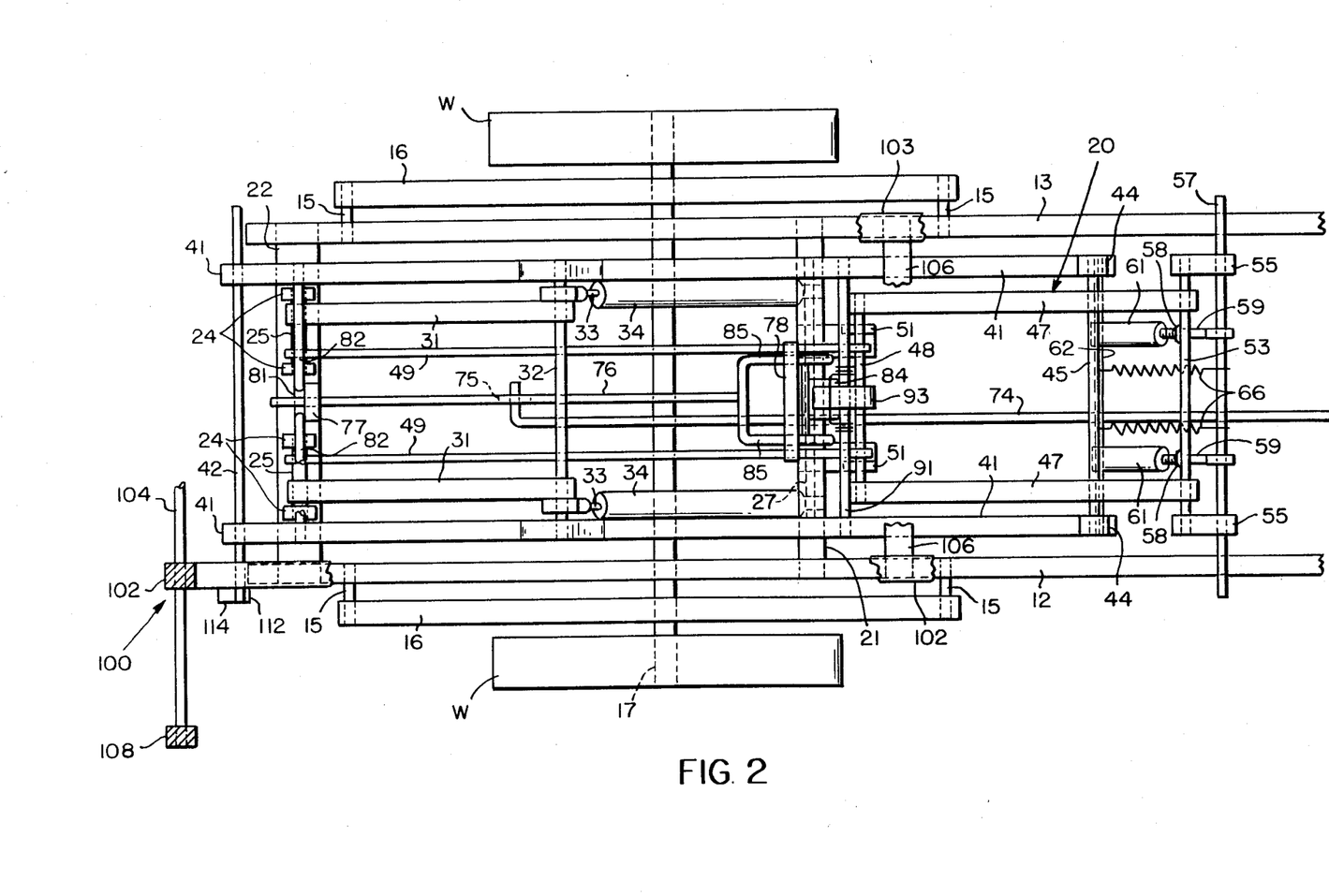
FIG. 2 is a fragmentary plan view of this vehicle with portions thereof again being cut away for purposes of illustration.
Figure 3:
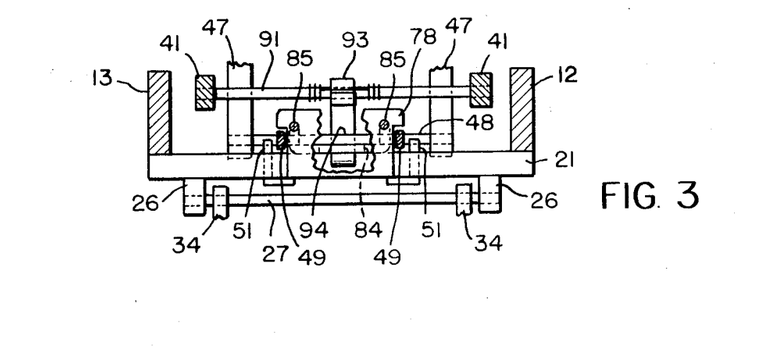
FIG. 3 is a fragmentary sectional view taken along line 3—3 in FIG. 1 looking in the direction of the arrows.

Pivotally mounted intermediate their ends on shaft 45 between the two levers 41 are two other, spaced levers 47. The lower ends of levers 47 (FIG. 1) are secured to opposite ends a rod or shaft 48, which extends parallel to shaft 45 between frame members 12 and 13, and which is connected to the rear pivot pins 25 by a pair of rods or tension links 49 (FIG. 2). When the assembly is in its lowered positon as shown in the drawings, shaft 48 is removably seated intermediate its ends in a pair of recesses formed in the upper surfaces of two support plates 51, which project upwardly from beam 21 intermediate its ends. The upper ends of levers 47 are pivotally connected to another shaft 53, which extends parallel to shaft 45 forwardly thereof. Opposite ends of shaft 53 project beyond the levers 47 and are pivotally connected each to one end of a pair of identical links 55, the opposite ends of which are pivotally connected to another bed locking rod 57 adjacent opposite ends thereof. Rod 57, which also extends parallel to shaft 45, projects at opposite ends slightly beyond each of the side frame member 12 and 13 for a purpose noted hereinafter.

Inwardly of the links 55 the latching or locking rod 57 is also pivotally connected to the upper ends of a pair of externally-threaded rods 59 upon which nuts or collars 58 are adjustably threaded. The opposite or lower ends of rods 57 are slidable into the axial bores of a pair of sleeves 61 to the extent permitted by the adjusting nuts 58. The lower ends of sleeves 61 are pivotally connected to another shaft 52, opposites ends of which are rotatably mounted in dogleg-shaped projections 64 that extend downwardly from the forward ends of the levers 41. The rod 57 and shaft 62 are also innerconnected by a pair of spaced tension springs 66, which are positioned between the sleeves 61 and attached at opposite ends to rod 57 and shaft 62, respectively, to urge links 55 and rod 57 clockwise in FIG. 1.

Mounted intermediate its ends to pivot out a horizontal pin that is secured on the truck frame beneath the floor of cab section 11 is a selector arm or lever 72, the upper end of which extends into the cab for manual operation by the driver. Pivotally connected at one end of the lower end of the selector lever 72, and extending from beneath the cab rearwardly and upwardly over the rear axle 17 is a rigid link 74. At its rear end the line 74 is pivotally connected to a lug 75 formed on a reciprocable selector rod 76 intermediate its ends. Rod 76 is slidably guided adjacent opposite ends thereof in registering openings formed in a pair of guide brackets 77 and 78, which project upwardly from the frame beams 22 and 21, respectively, and substantially medially thereof. When the lever 72 is in its full line position as shown in the drawings, the rear or left end of selector rod 76 projects over the top of a downwardly-bowed or U-shaped midsection 81 of an elongate dump latching rod 82, opposite ends of which are secured in the two load operating levers 41 just forwardly of the rear bed locking rod 42.

At its opposite or forward end (right end in FIG. 1) the selector rod 76 extends as at 84 beyond the bracket 78 to confront the space between the two shaft-supporting plates 51. Secured to or integral with rod 76 just rearwardly of its forward end 84, and supported in a horizontal plane above the forward end of rod 76 is a bifurcated projection comprising a pair of spaced-parallel legs 85, the undersides of which are disposed in a plane generally tangential to the upper surface of shaft 48, when the latter is supported in its lowered position (FIG. 1) on members 51.

Secured at opposite ends in the two load operating levers 41 to be supported thereby above and parallel to shaft 48, when the latter is supported on members 51, is another rod or shaft 91. Pivotally mounted adjacent its upper end on shaft 91 approximately medially of its ends is a pivotal latching hook 93. In the side thereof which faces the furcations 85 on selector rod 76, the hook 93 has therein a notch or slot 94, which is adapted to engage over and latch the shaft 48 medially of its ends, when the parts are in their full line positions as shown in the drawing. In this latching position of the hook 93 its upper end registers with the space between the furcations 85 on the selector rod 76, and its lower ends confronts directly upon, and is spaced from, the projecting end 84 of rod 76. Hook 93 is connected to shaft 91 by a conventional torsion spring or the like (not illustrated), which normally urges the hook 93 clockwise in FIG. 1 about shaft 91 toward its latching position for a purpose noted hereinafter.

When the selector lever 72 is swung manually from its full line to its broken line position as shown in FIG. 1, the link 74 is drawn toward the right, thereby causing the selector rod 76 also to be shifted toward the right to a second position in which its left end is disengaged from over the top of the bowed section 81 of the dump latching rod 82, and its right end 84 is moved into engagement with the lower end of hook 93, thereby causing it to swing counterclockwise about shaft 91 far enough to disengage its slot 94 from the shaft 48. Also at this time the furcations 85 pass by opposite sides of the hook 93 and project over the top of the shaft 48 to prevent the latter from being lifted off of the support members 51 as noted hereinafter.

The numeral 100 denotes generally a truck bed of the type which is adapted releasably to be attached to the above-described hoist and dump assembly 20 by means of the bed-locking rods 57 and 42. Bed 100 comprises a pair of elongate, similarly-shaped side beams 102 and 103, which are secured in spaced, parallel relation by a pair of shafts 104 and 105 that extend transversely between adjacent ends of the beams. One or more bars 106 also extend between the beams intermediate their ends to overlie levers 41, when the assembly 20 is in its lowered position, thereby helping to prevent any undesirable pivotal movement of levers 41. In the embodiment illustrated shafts 104 and 105 project at opposite ends beyond the beams 102 and 103 and have pivotally mounted thereon four collapsible legs or bed supporting members 108, which can be swung to operative positions in which their feet 109 engage the ground releasably to support the truck bed 100 on the ground after it has been detached from assembly 20 as noted hereinafter.

The distance between the beam members 102 and 103 is substantially equal to the distance between the frame members 12 and 13 of the truck frame, so that when the bed 100 is in its lowered position on the frame as shown in FIG. 1, beams 102 and 103 rest upon, and extend parallel to, the frame members 12 and 13, respectively. Also at this time, opposite ends of the locking rods 42 and 57 are wedged beneath the undersides of the beams 102 and 103, and over the upper surfaces of the legs 112 and 113, respectively, of a pair of right-angular hook members or brackets 114 and 115, which are secured to and project downwardly from opposite ends, respectively, of each of the beams 102 and 103. With the parts in these positions, the truck bed is releasably secured to the assembly 20, so that movements of the latter will be imparted to the bed 100.

It is to be understood that the detachable truck bed 100 may otherwise be of any conventional configuration. That is, the walls for retaining a load on bed 100 may be, for example, similar to those of a conventional dump truck or pick up truck, and for this reason the walls have been illustrated in phantom by broken lines in FIG. 1 as denoted at L. The walls L, of course, would be secured in a conventional manner to the bed frame members 102 and 103 for movement therewith.

In use, and assuming that lever 72 is in its full-line position as shown in FIG. 1, the assembly 20 is in its dumping mode, wherein rod 76 has its left end (FIG. 1) engaged over the midpoint of the dump latching rod 82; and the latching hook 93 has its slot 94 latched or engaged over the shaft 48. Now when the cylinders 34 are operated, for example, in a conventional manner from the cab section 11 of the truck, their rods 33 are driven outwardly into the broken line positions in FIG. 1, whereby the shaft 32, which is carried by the levers 41, also is swung along an arc (FIG. 1) to its upper or broken line position. This movement causes the bed operating levers 41 to be pivoted counterclockwise about the axis of the dump latching rod 82, which at this moment is secured intermediate its ends against any upward movement by virtue of the selector rod 76. The shaft 91, which is carried by the levers 41, also is caused to swing counterclockwise with the levers, and since shaft 48 is secured by the hook 93 for movement with the shaft 91, the shaft 48 is swung upwardly off of the support plates 51, during which movement the hook 93 prevents the levers 47 from pivoting relative to the operating levers 41. During the counterclockwise swinging movement of the operating levers 41 the locking rods 42 and 57 remain engaged with the locking brackets 114 and 115 on the bed 100, so that the assembly 20 and the bed 100 are pivoted in unison about the shaft 82 into a dumping position in which the right or forward end of the bed 100 is swung upwardly around the axis of the dump latching rod 82, while the rear or left end of the bed is swung downwardly to face the ground so that the load contained within the walls L will slide downwardly and out of the rear or left end of the walls in a manner similar to the action which takes place during the elevation of a conventional dump truck bed.

After the load has been dumped the cylinders 34 are operated in known manner to cause their rods 33 to be retracted back into the cylinders, thereby causing the parts to turn to their lowered positions as shown in FIG. 1.

If instead of dumping a load from the bed 100 it is desired to lift the bed vertically, and to detach it from the truck frame for the purpose of leaving the bed (loaded or unloaded) supported on its legs 108, the lever 72 is moved to its broken line position in FIG. 1, whereby the selector rod 76 is shifted toward the right to disengage its left end from the dump latching rod 82, and to cause its forward end 84 to disengage the hook 93 from the shaft 48, and simultaneously to shift the latching fork or furcations 85 over the top of shaft 48 to prevent the latter from being moved vertically from its rest position on the supports 51. Thereafter the cylinders 34 are once again actuated to cause shaft 32 to be swung into its elevated or broken line position as shown in FIG. 1. This time, however, the dump latching rod 82 is not latched by the rod 76, so that it, and the left ends of levers 41, are free to be swung by levers 31 upwardly and in a counterclockwise direction relative to the stationary pivot pins 25. Also, since the hook 93 is disengaged from shaft 48, and the latter is secured by fork 85 against movement on supports 51, the levers 47 are now caused to pivot counterclockwise about the now-fixed axis of shaft 48, thereby causing shaft 45 and the right ends of levers 47 to be swung in the same direction. The operating levers 47 are thus swung with translational counterclockwise movement (FIG. 1) about the axes of pins 25 and the now-fixed shaft 48.

During this movement the shaft 62, which is carried by the dogleg sections 64 on levers 41, is swung upwardly and toward the left of FIG. 1, thus drawing the forward locking rod 57 rearwardly or toward the left in FIG. 1 to disengage it from the locking brackets 115, and to allow pins 59 to slide into sleeves 61 thereby to effect a clockwise rotation of the links 55 about the pins 53.

During this swinging, translational movement of the operating levers 41 the rods 42 and 57 are engaged with the undersides of the bed beams 102 and 103 so their motion is imparted to the bed 100. The assembly is designed so that the rods 42 and 57 are swung in unison, and at the same rate, whereby the beam members 102, 103 of the bed 100 are caused to remain in horizontal positions so that the load within the walls W of the bed is not disturbed.

By the time that the load bed 100 reaches its completely hoisted position, the forward locking rod 57 will have slid rearwardly along the undersides of the beam members 102, 103 so that it is completely disengaged from the forward locking brackets 115. At this time the supporting legs 108 can be swung downwardly to active positions in which their feet 109 are positioned just above the ground or other surfaces upon which the load bed is to be deposited. The cylinders 34 are then operated to retract their rods 33, and during the initial lowering of the assembly 20 the feet 109 engage the ground so that the entire load bed 100 becomes supported on the legs 108. At this time if the rear bed locking rod 42 has not become disengaged from the brackets 114, the truck operator can move the truck itself slightly forwardly relative to the now ground-supported load bed, so that the rod 42 becomes disengaged from the bracket 114, thereby permitting the assembly 20 to be collapsed into its completely lowered position.

As previously noted, the supporting legs 108 are pivotally mounted on portions of the shafts 104 and 105 which extend beyond opposite sides of the frame members 12 and 13, so that the legs 108 are positioned outwardly from the truck frame, thus enabling the truck chassis to be driven out from under the load bed, and to be attached to a different load bed, if desired.

In the above-described embodiment the springs 66 are not essential, but are used to withdraw the forward locking rod 57 clockwise (FIG. 1) even further than would gravity, when the assembly is operating on its bed-lifting cycle, and thus help to prevent undesirable reengagement of rod 57 with brackets 115 after a load bed has been elevated and the unloaded assembly 20 has commenced its descent.

When bed 100 is to be lowered back onto the truck frame the truck is backed under the elevated bed, the assembly 20 is raised to engage and slightly lift the bed, the legs 108 are then swung to their inoperative positions and the assembly 20 is then lowered. As the assembly 20 decends, the sleeves 61 and the associated rods 59 cause the forward locking rod 57 to be urged toward the right in FIG. 1 along the bottoms of the beams 102 and 103, and once again into locking engagement with the legs 113 of the brackets 115. This forced locking of the forward rod 57, which is assisted by the weight of the load bearing downwardly on assembly 20, also causes the load bed 100 to be shifted as opposite ends of the rod 57 engage the brackets 115, thereby drawing the rear locking brackets 114 into engagement with the rear locking rod 42. Thus when the assembly 20 is completely collapsed, the bed 100 will be once again secured to the assembly by the locking rods 42 and 57.

Figure 4:
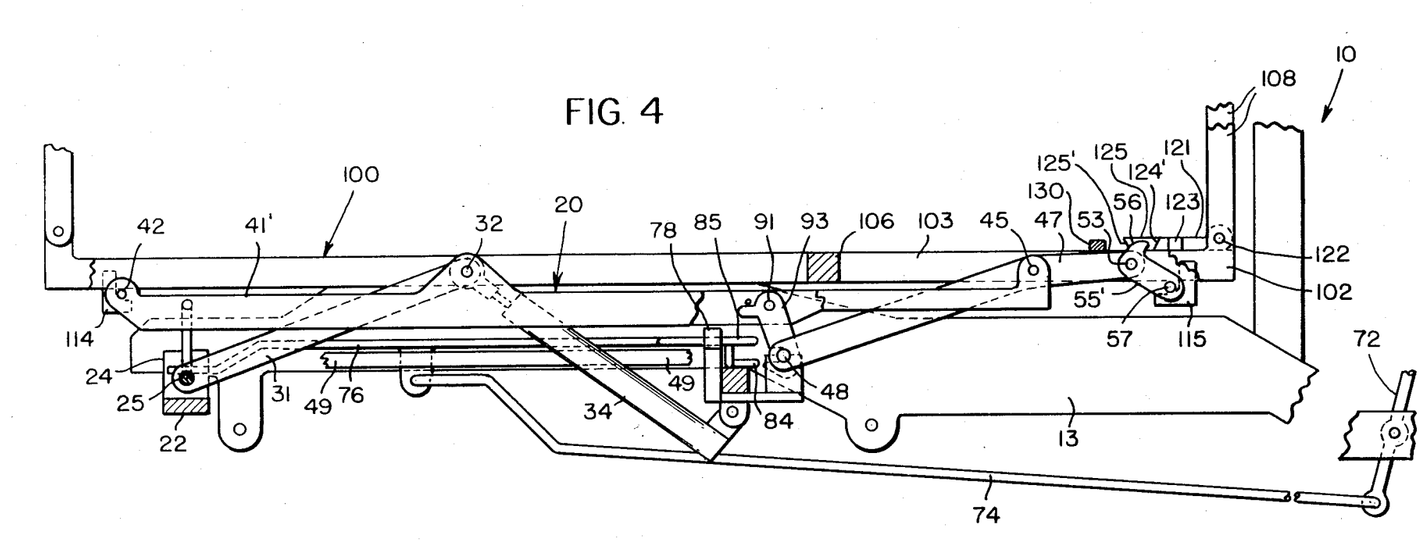
FIG. 4 is a fragmentary side elevational view of a second embodiment of this vehicle, and showing a modified means for operating its front load bed locking rod.
Figure 5:
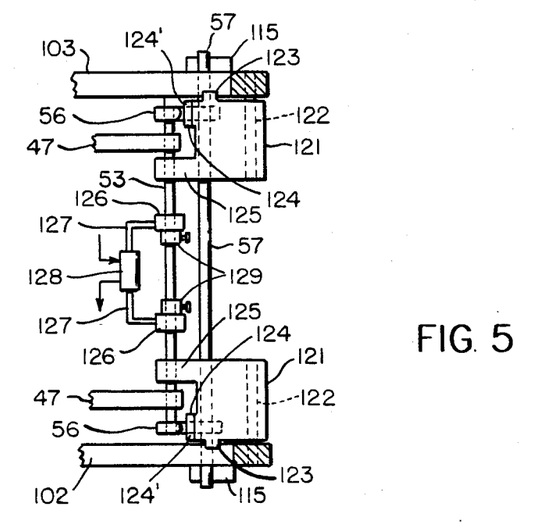
FIG. 5 is a framentary plan view of this modified operating means.

FIGS. 4 and 5 illustrate an alternative means of manipulating the front locking rod 57 of the assembly 20. In this embodiment wherein like numerals are employed to denote elements similar to those employed in the first embodiment, a pair of modified operating levers 41' support between their forward ends the shaft 45 and the two levers 47, which are similar to those employed in the first embodiment. Unlike the first embodiment, however, the levers 41' do not have on their forward ends the downward projecting dogleg sections 64, nor the elements 59, 61 and 66 associated therewith. Instead the locking shaft 57 is carried by a pair of modified links 55', which are pivotally mounted intermediate their ends on the shaft 53, which is carried by the levers 47. Links 55' have on their upper ends generally nose-shaped camming lugs 56, which extend above and forwardly of shaft 53 when the parts are in positions shown in FIGS. 4 and 5.

Two similarly-shaped camming members 121 (FIG. 5) are mounted each at its outer end to pivot about one of a pair of pins 122, which project from the inside surfaces of the load bed beams 102 and 103 adjacent their forward ends. Intermediate its ends each member 121 has thereon a lateral projection 123, which overlies the upper surface of the adjacent beam 102 or 103, when the members 121 are in their positions as shown in FIG. 4. Projecting from the inner end of each member 121 are two, spaced, parallel camming lugs 124 and 125. When the members 121 are in their illustrated positions, inclined camming surfaces 124' on the lugs 124 are held in registering relation with the camming lugs 56 on the links 55', while the oppositely inclined camming surfaces 125' on lugs 125 overlie shaft 53 between levers 47 and a pair of cammimg rings 126 (FIG. 5) that are axially slidable on shaft 53. The rings 126 are connected by rods 127 to the piston rod and housing, respectively, of a conventional slave cylinder 128 that is operated from within cab 11 by any conventional means.

In use, when the bed 100 is to be detached from assembly 20, the mechanism is placed in its bed-lifting mode, and slave cylinder 128 is operated, if necessary, to retract rings 126 into their inoperative positions as shown in FIG. 5, where they abut adjustable stop collars 129 on shaft 53. In this mode operation of the associated cylinders 34 will cause bed 100 to be swung with counterclockwise, translational movement about the fixed axes of members 25 and 48. During this movement the links 55' are drawn or swung away from the camming members 121, which therefore have no effect on the links. Also during this movement the locking rod 57 is withdrawn from the slots in brackets 115 and slides along the bottoms of the beams 102 and 103 as in the first embodiment. During the last portion of the ascent of bed 100 the tips or upper ends of the now-upright levers 47 engage a joist 130 (FIG. 4) on bed 100 thereby shifting the bed toward the left in FIG. 4 far enough to disengage locking rod 42 from brackets 114.

After bed 100 has reached its elevated position and the supporting legs 108 have been swung downwardly to their operative positions, the slave cylinder 128 is operated from the cab to cause its piston rod to be driven to its extended position, whereby the two camming rings 126 are shifted outwardly on shaft 53 to operative positions (not illustrated) in which they register with the camming surfaces 125' on lugs 125. Consequently, when assembly 20 starts its descent, the camming rings engage camming lugs 125 and cause the camming members 121 to be swung slightly clockwise (FIG. 4) about their respective pins 122, thereby lifting the lugs 124 out of the pathways of the descending links 55' and thereby preventing any interengagement between the camming lugs 56 on the links 55' and the camming members 121. Links 55' thus continue to hang straight down by gravity and the bed 100 remains disengaged from assembly 20 so that the bed comes to rest on the extended legs 108 as the assembly 20 continues downwardly to its completely collapsed position.

On the other hand, when it is desired to retrieve the load bed 100 from its detached, elevated position, the pilot cylinder 128 is operated to return rings 126 to their illustrated, retracted positions, after which the assembly 20 is elevated upwardly beneath the load bed 100 to engage opposite ends of the locking rods 42 and 57 with the undersides of the beam members 102 and 103. Then, after the supporting legs 108 have been swung upwardly into their inoperative positions and the assembly 20 has commenced its downward movement, the camming rings 126 do not pivot members 121 clockwise, and consequently the noses 56 on the links 55' will engage the camming surfaces 124' on members 121 to cause the links 55' to be swung counterclockwise about the shaft 53, and thereby positively to drive opposite ends of the locking rod 57 into the slots formed by the legs on the bracket members 115. Consequently both locking rods 42 and 57 will become reengaged with the brackets 114 and 115 as in the first embodiment.

Although it has not been described in detail in connection with this second embodiment, it will be apparent that if the operating lever 72 is shifted to its full line position, the structure shown in FIGS. 4 and 5 will function in the usual manner to cause the entire load bed 100 to be tilted about the axis of the fixed pins 25. Moreover, it will be apparent also that the camming members 121 may be swung into and out of their operative positions by other automatic means, or even manually operated means, if desired.

Figure 6:
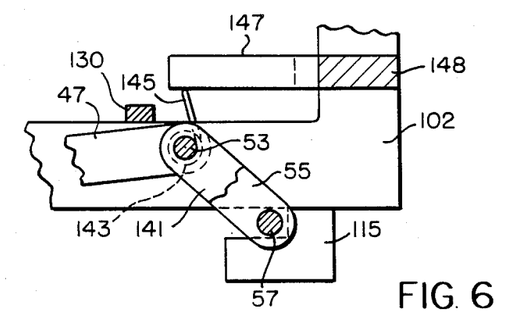
FIG. 6 is an enlarged, fragmentary side elevational view of a third form of this locking rod operating means.
Figure 7:
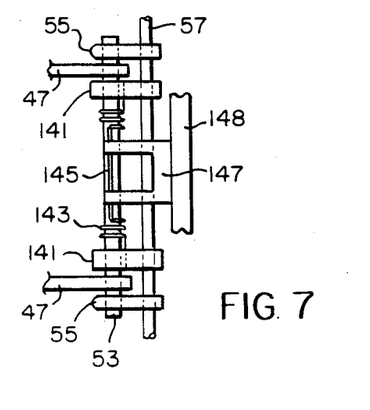
FIG. 7 is a fragmentary plan view of this third form of operating means.

FIGS. 6 and 7 show still another means for releasably engaging the front locking rod 57 with the brackets 115. In this embodiment, wherein like numerals are again employed to denote elements similar to those illustrated in the preceding embodiments, the forward locking rod 57 is again mounted by links 55 for swinging movement about the axis of the shaft 53, which extends between the forward ends of levers 47. Each of two other, spaced, identically shaped links 141 is secured at one end (the left end in FIG. 7) to shaft 53 for rotation therewith between the levers 47. The opposite ends of links 141 are secured to the locking rod 57 at axially spaced points intermediate its ends. A coiled torsion spring 143, which surrounds shaft 53 between links 141, is secured at opposite ends to links 141, and has intermediate its ends a linear, generally U-shaped loop section 145 which projects tangentially from the upper side of shaft 53 when the parts are in the bed locking positions shown in FIGS. 6 and 7.

Intermediate its ends the loop section 145 of spring 143 is engaged with the underside of the legs of a generally U-shaped fork or bracket 147, which is secured at its closed end to a stationary bar 148 that extends between the forward ends of the bed beams 102 and 103. When these parts are in the positions shown in FIG. 6, the two legs of bracket 147 engage and urge the loop-section 145 of the torsion spring in a counterclockwise direction about the axis of shaft 53, thereby tending also to rotate shaft 53 in a counterclockwise direction. The links 55, which are fixed to shaft 53, therefore tend also to rotate the locking rod 57 in a counterclockwise direction, and into engagement with the undersides of beams 102 and 103.

When the lift assembly 20 is operated to elevate the bed 100, the shaft 53 is drawn toward the left in FIGS. 6 and 7 during the upward translational movement of the levers 47, thereby disengaging the locking rod 57 from the brackets 115, and allowing the weight of rod 57 and its attached links to pivot downwardly about shaft 53. When the bed 100 has reached its elevated position and its legs 108 have been lowered, the truck is positioned to make sure that the rear locking rod 42 remains engaged with the brackets 114. This assures that the spring loop 145 will not engage the bracket legs 147 during the descent of the assembly 20, and therefore will permit the assembly to drop without engaging the forward locking rod 57 with the brackets 115.

When it is desired once again to pick up the load bed 100, the truck frame is placed beneath the elevated bed and the assembly 20 is once again elevated into engagement with the undersides of the beams 102 and 103. Before lowering the assembly 20 the truck is positioned so that the rear locking rod 42 is spaced slightly forwardly of the rear latching brackets 114, after which the assembly 20 is lowered. During this movement the spring loop 145 engages the projecting legs of bracket 147 and causes shaft 153 to be swung counterclockwise, thereby swinging the links 55 in the same direction, and causing the latching rod 57 to re-engage into the brackets 115. Continued downward movement of the assembly 20 causes the bed 100, as in the preceding embodiments, to be shifted slightly forwardly to engage the rear locking rod 42 in the brackets 114, thus completing the attachment of the bed 100 to assembly 20.

From the foregoing it will be readily apparent that the present invention provides relatively simple and inexpensive means for providing a truck bed with both hoist and dump capabilities. Moreover, both the hoist and the dump operations are effected by the same cylinders 34, and the selection can be made merely by manipulating the selector lever 72 in the cab section of the vehicle, This option is of particular value to trucks of the type which are employed on farms, which at times are used for hauling loads that are particularly suitable for rapid unloading, as by dumping or tilting the load bed, and which at other times may be used for hauling animals or other products which require a different type of truck bed. The present invention therefore provides relatively simple means for switching or substituting one type of truck bed for another, thereby lending increased versatility to the truck itself.

While this invention has been illustrated and described in detail in connection with the use of the latching rod 76 and the projection 85 for securing shaft 48 and rod 82 against motion during elevation of the truck bed, it will be apparent that these two latching devices could be replaced by hooks pivotally mounted on the frame for pivotal movement into and out of latching modes relative to shaft 48 and 82. Moreover, while hook 93 has been used to fix levers 47 against pivotal movement relative to members 41 during the dump mode operation, it will be apparent that the mechanism could be operated without hook 93 because shaft 48 is fixed at a predetermined distance from the axis of pins 25 by the interconnecting rods or bars 49. Therefore, when rod 76 overlies the latching rod 82 to hold down the left ends of members 41, any pivotal movement of the latter will be imparted simultaneously to the interconnected rods 49 and levers 47, which therefore pivot in unison with members 41 about the axis of pins 25.

On the other hand, when rod 76 is in its other position in which it releases rod 82, and pivotal motion imparted to levers 31 by cylinders 34 will be imparted through members 41 to levers 47, which will thereby pivot about shaft 48, which in this mode will be held by the weight of the assembly 20 on the seats or notches in the supports 51.

It will likewise be apparent that the mechanism could be operated with hook 93 and without rods 49, but it is preferred to use both.

Also, it will be apparent that this invention is capable of still further modification, and that this application is intended to cover any such modifications as may fall within the scope of one skilled in the art, or the appended claims.

What we claim is:

1. A vehicle comprising
   a wheel-mounted frame,
   a load bed, and
   means releasably mounting said bed on said frame for movement therewith, said mounting means including bed dumping means operable to tilt said bed on said frame about a first axis located adjacent one end of said bed, thereby to tilt the bed from a first, horizontal position to an inclined position in which a load on the bed is dumped from said one end thereof,
   bed lifting means releasably attached to said bed and operable to move said bed upwardly and downwardly relative to said frame without disturbing the load on said bed, and into and out of a second horizontal position spaced above said first horizontal position,
   manually operable selector means movable to a first position for effecting operation of said dumping means and to a second position for effecting operation of said lifting means,
   means operative in response to the movement of said load bed from said first to said second horizontal position automatically to detach the bed from said lifting means so that the bed can be separated therefrom, and
   means for selectively reattaching said bed to said lifting means during movement of said bed downwardly toward said first horizontal position.

2. A vehicle as defined in claim 1, wherein said dumping means comprises
   at least one operating member mounted on said frame beneath said bed to extend longitudinally of said bed,
   spaced locking means mounted on said member adjacent opposite ends, respectively, thereof, and releasably engagable with cooperating locking means on said bed to attach the bed to said member for movement therewith,
   latching means operative, when said selector means is in said first position, releasably to secure one end of said member for pivotal movement about said first axis, and
   drive means on said frame connected to said member and operable to effect the tilting of said member and the attached bed about said first axis, when said selector means is in said first position.

3. A vehicle as defined in claim 2, wherein said lifting means comprises
   at least two spaced levers interposed between said frame and said member, each of said levers being connected adjacent one end to said member at one of two spaced points therealong for pivotal movement relative to said member about an axis parallel to said first axis,
   one of said levers being connected at its opposite end to said frame for pivotal movement about said first axis, and
   means mounting the opposite end of the other of said levers on said frame selectively for movement with said member when said selector means is in said first position, and for pivotal movement about a second axis spaced from and parallel to said first axis, when said selector means is in said second position,
   said latching means being operative to release said one end of said member, when said selector means is moved to its second position, thereby to enable said member to be swung with arcuate, translational movement about said first and second axes upon operation of said drive means.

4. A vehicle as defined in claim 3, wherein said mounting means for said opposite end of said other lever comprises a rigid link mounted at one end to pivot about said first axis, and connected at its opposite end to said opposite end of said other lever for selective pivotal movement relative thereto about an axis which coincides with said second axis during said translational movement of said member, and which is swung about said first axis during said pivotal movement of said member.

5. A vehicle as defined in claim 4, including further latching means for releasably securing said opposite end of said other lever on said frame for pivotal movement about said second axis.

6. A vehicle as defined in claim 4, including means operative during the upward translational movement of said member to disengage one of said cooperating locking means on said bed and on said member, repsectively, relative to the other thereby to detach said member from said bed.

7. A vehicle as defined in claim 6, including actuator means for selectively reengaging said one cooperating locking means with said other during the downward, translational movement of said bed selectively to reattach said bed to said member.

8. A vehicle as defined in claim 7, wherein
   said spaced locking means on said member comprises a pair of spaced, parallel rods positioned adjacent opposite ends, respectively, of said member, and
   said cooperating locking means on said bed comprises at least two, spaced brackets projecting from said bed adjacent opposite ends thereof and each having therein a locking slot for engagement with one of said rods during operation of said actuator means, and for disengagement from the associated locking rod during elevation of said bed.

9. A truck, comprising
   a frame,
   an operating member movably mounted on said frame,
   drive means on said frame connected to said operating member and operable to swing said member with arcuate, translational movement and in opposite directions about a pair of spaced, parallel axes,
   a load bed releasably attached to said member to be raised and lowered thereby between a first horizontal position in which the bed is supported on said frame, and a second horizontal position spaced above said first position,
   means operative in response to the movement of said bed from said first to said second horizontal position automatically to detach said bed from said member thereby to permit the detached bed to be supported in said second position independently of said operating member, and means for selectively reattaching said bed to said member during the lowering of said bed by said member from said second position.

10. A truck as defined in claim 9, including cooperating locking means on said bed and on said operating member, respectively, and releasably engaged to attach said bed to said member, one of said locking means being connected to said detaching means for movement thereby out of engagement with the cooperating locking means during movement of said bed from its first to its second position, and said reattaching means including means for positively moving said one locking means back into reengagement with said cooperating locking means during the lowering of said bed back to its first horizontal position.

11. A truck as defined in claim 10, wherein said one locking means comprises at least one locking pin movably mounted on said operating member and said cooperation locking means comprises a slot in said bed engageable with said pin to attach said bed to said member, and said detaching means comprises means connecting said pin to said operating member to be withdrawn thereby from said slot in said bed during movement of said member in a direction to raise said bed.

12. A truck as defined in claim 11, wherein said connecting means includes said reattaching means which is operative positively to move said pin back into engagement with said slot in said bed during the lowering of the bed to its first position.

13. A truck as defined in claim 11, wherein said means connecting said locking pin to said operating member comprises at least one link supporting said pin on said member for swinging movement into and out of engagement with the underside of said bed for sliding movement therealong and into said slot during descent of said bed, and camming means on said link engageable with cooperating camming means on said bed to swing said pin positively into engagement with said underside of the bed during descent of the latter.

14. A truck as defined in claim 9, including means mounting said operating member on said frame for movement by said drive means selectively about said pair of axes to impart the translational movement thereto, or about one only of said axes to impart a tilting movement to the bed, and means preventing operation of said bed detaching means during tilting movement of said bed about said one axis.

15. A truck as defined in claim 14, wherein said mounting means comprises a first pin secured on said frame coaxially of said one axis, a second pin mounted on said frame for movement into and out of a first position in which it is disposed coaxially of the other axis of said pair, a pair of spaced levers pivotally connected each at one end to one of said pins and at its opposite end to said operating member at one of two spaced points therealong, and manually operable selector means movable between a first position in which said second pin remains in its first position during operation of said drive means thereby to impart said translational movement to said member, and a second position in which said second pin is mounted for movement with said member, and said member is releasably secured adjacent one end thereof for tilting movement about said first pin.

16. A truck as defined in claim 9, wherein said frame comprises a pair of laterally spaced beams, said operating member is one of two identically shaped members mounted on said frame for movement in unison and selectively for pivotal movement about a fixed shaft that extends transversely between said beams adjacent one end of said frame coaxially of one of said axes, and for said translational arcuate movement about the axis of said fixed shaft and a second shaft which is mounted on said frame parallel to said fixed shaft for movement into and out of a first position in which said second shaft is disposed coaxially of the other axis of said pair.

17. A truck as defined in claim 16, including manually operable means for selecting the mode of movement of said operating members, comprising a selector operative in a first position releasably to secure one end of said operating members coaxially of said fixed shaft for pivotal movement thereabout, and means responsive to the movement of said selector to its first position to cause said second shaft to move with said members during pivotal movement about the axis of said fixed shaft.

18. A truck as defined in claim 17, wherein the last-named means includes latching means operative upon movement of said selector to a second position to fix said second shaft in its first position and to release said one end of said operating members for translational movement relative to said fixed shaft.

19. A truck as defined in claim 18, wherein said latching means includes means to prevent operation of said bed detaching means, when said second shaft is releasably attached to said operating members for movement therewith.

20. A truck as defined in claim 16, wherein at least one slotted bracket is fixed to said bed adjacent each end thereof, and with the slots in said brackets formed in part by the underside of said bed, and a pair of spaced, parallel, transversely extending locking rods are carried by said operating members adjacent opposite ends thereof and are slidable selectively into and out of the slots in said brackets thereby selectively to attach the bed to, and to detach it from, said operating members.

21. A truck as defined in claim 20, wherein said detaching means comprises means for automatically withdrawing said locking rods from said slots in said brackets during movement of said bed from its first to its second position, and said reattaching means comprises means for selectively urging said locking rods into said slots in said brackets during movement of said bed from its second to its first position.

22. A truck as defined in claim 21 wherein said reattaching means includes cooperating camming means on said bed and on said operating members, respectively, and selectively engageable to positively urge said locking rods into the slots in said brackets, and control means operable from a cab section on the truck selectively to control engagement of said camming means during descent of said bed, thereby selectively to cause said bed to be reattached to said operating members.

* * * * *